No. 629,815. Patented Aug. 1, 1899.
C. E. & J. E. POINTON.
MACHINE FOR DIVIDING DOUGH OR LIKE PLASTIC MATERIAL.
(Application filed Dec. 24, 1898.)

(No Model.) 5 Sheets—Sheet 1.

No. 629,815. Patented Aug. 1, 1899.
C. E. & J. E. POINTON.
MACHINE FOR DIVIDING DOUGH OR LIKE PLASTIC MATERIAL.
(Application filed Dec. 24, 1898.)
(No Model.) 5 Sheets—Sheet 3.

No. 629,815. Patented Aug. 1, 1899.
C. E. & J. E. POINTON.
MACHINE FOR DIVIDING DOUGH OR LIKE PLASTIC MATERIAL.
(Application filed Dec. 24, 1898.)
(No Model.) 5 Sheets—Sheet 4.

No. 629,815. Patented Aug. 1, 1899.
C. E. & J. E. POINTON.
MACHINE FOR DIVIDING DOUGH OR LIKE PLASTIC MATERIAL.
(Application filed Dec. 24, 1898.)
(No Model.) 5 Sheets—Sheet 5.
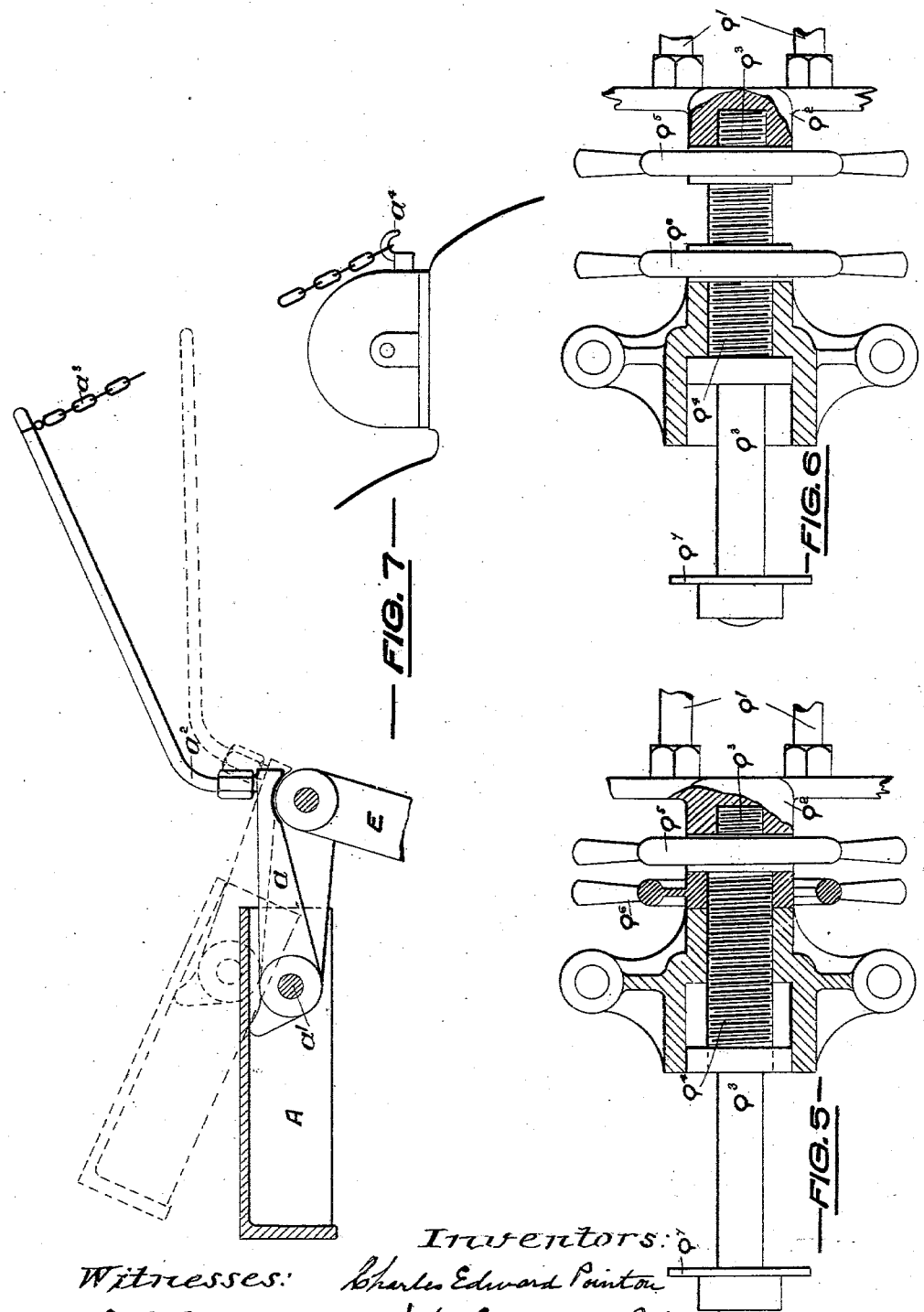
Witnesses:
E. B. Bolton
Inventors:
Charles Edward Pointon
John Edward Pointon
By Richards
their Attorneys

UNITED STATES PATENT OFFICE.

CHARLES EDWARD POINTON AND JOHN EDWARD POINTON, OF WELLINGTON, ENGLAND, ASSIGNORS TO THE LEWIS & POINTONS' PANIFICATION, LIMITED, OF LONDON, ENGLAND.

MACHINE FOR DIVIDING DOUGH OR LIKE PLASTIC MATERIAL.

SPECIFICATION forming part of Letters Patent No. 629,815, dated August 1, 1899.

Application filed December 24, 1898. Serial No. 700,227. (No model.)

*To all whom it may concern:*

Be it known that we, CHARLES EDWARD POINTON and JOHN EDWARD POINTON, subjects of the Queen of Great Britain and Ireland, and residents of Wrekin road, Wellington, in the county of Salop, England, have invented certain new and useful Improvements in Machines for Dividing Dough or Like Plastic Material, (for which we have filed an application for patent in Great Britain, No. 19,458, bearing date September 13, 1898,) of which the following is a specification.

Our invention consists of improvements in machines for dividing dough and like plastic material into a number of portions of uniform weight for bread-making and other purposes, the objects of such improvements being to insure the accurate and regular working and the handiness and durability of the machines, to enable them to be readily adjusted to the required weight of the divided portions of dough or plastic material, and to be safely and conveniently cleaned and inspected.

Figure 1:
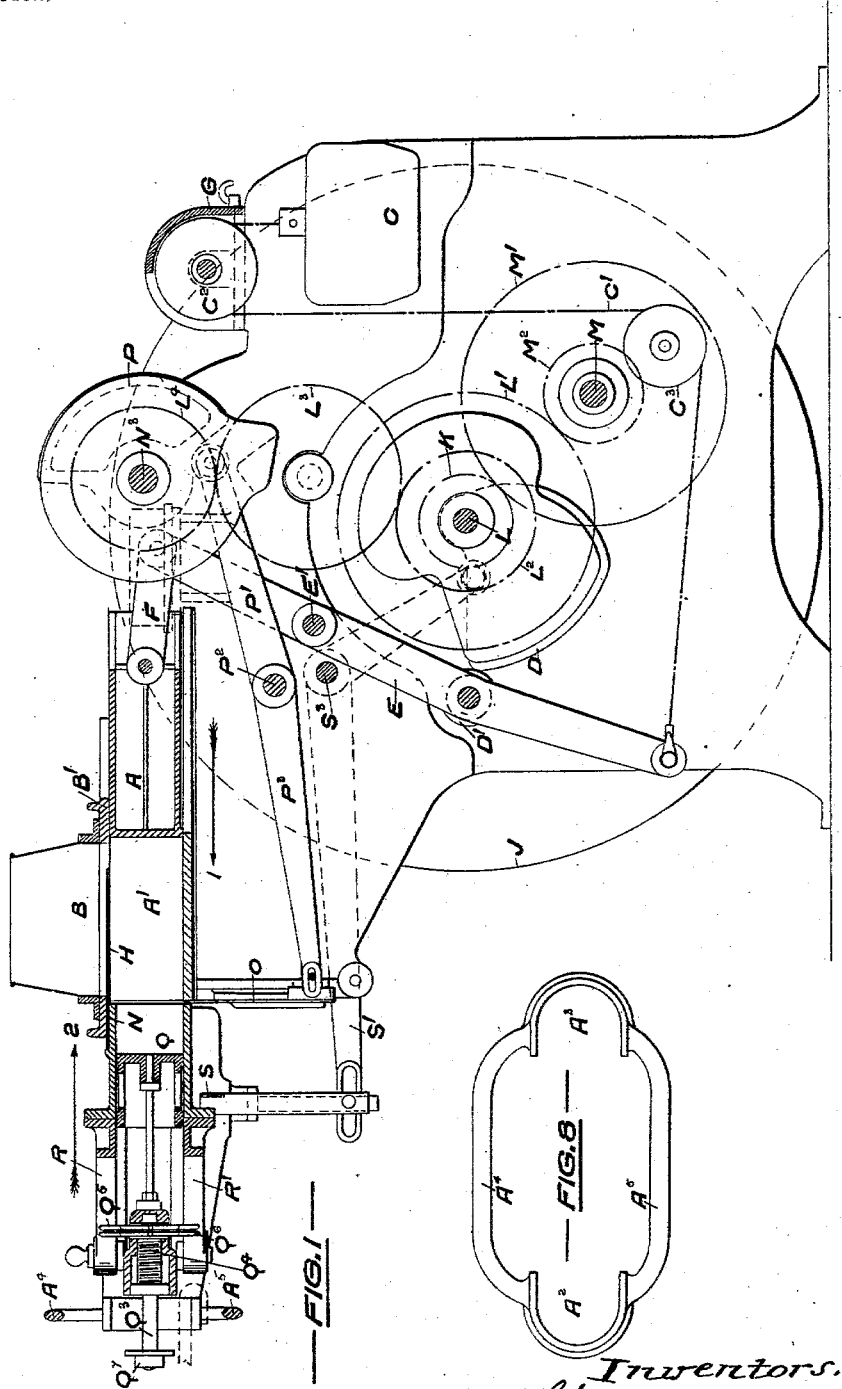
Figure 2:
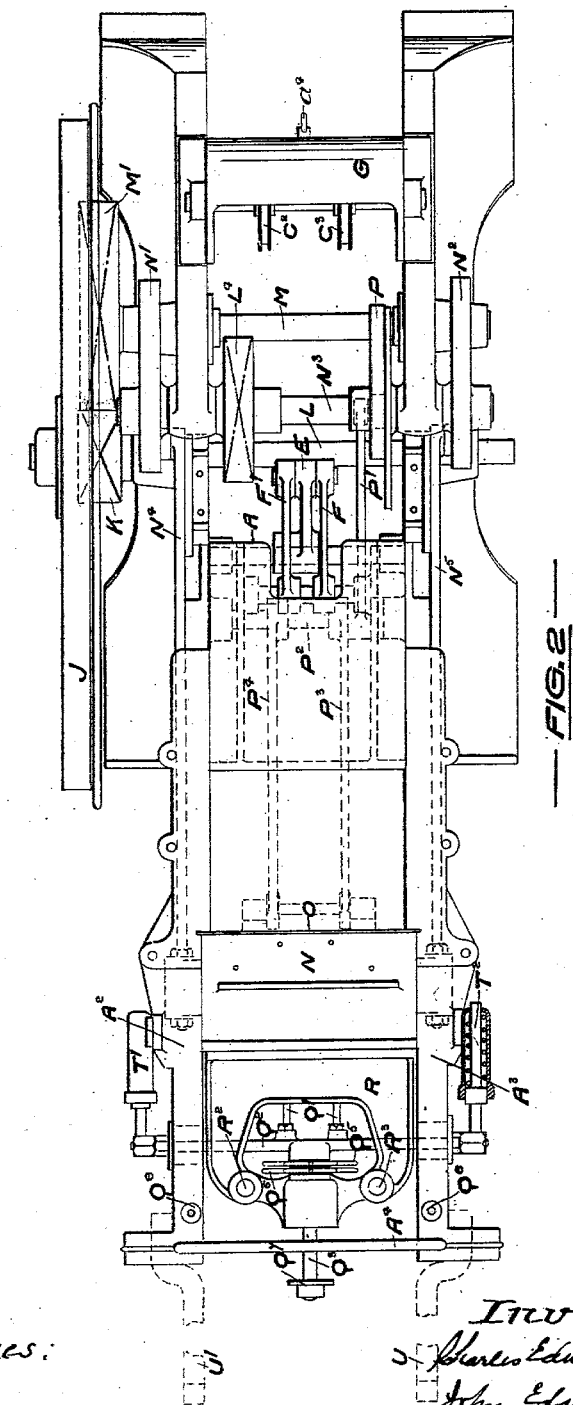
Figure 3:
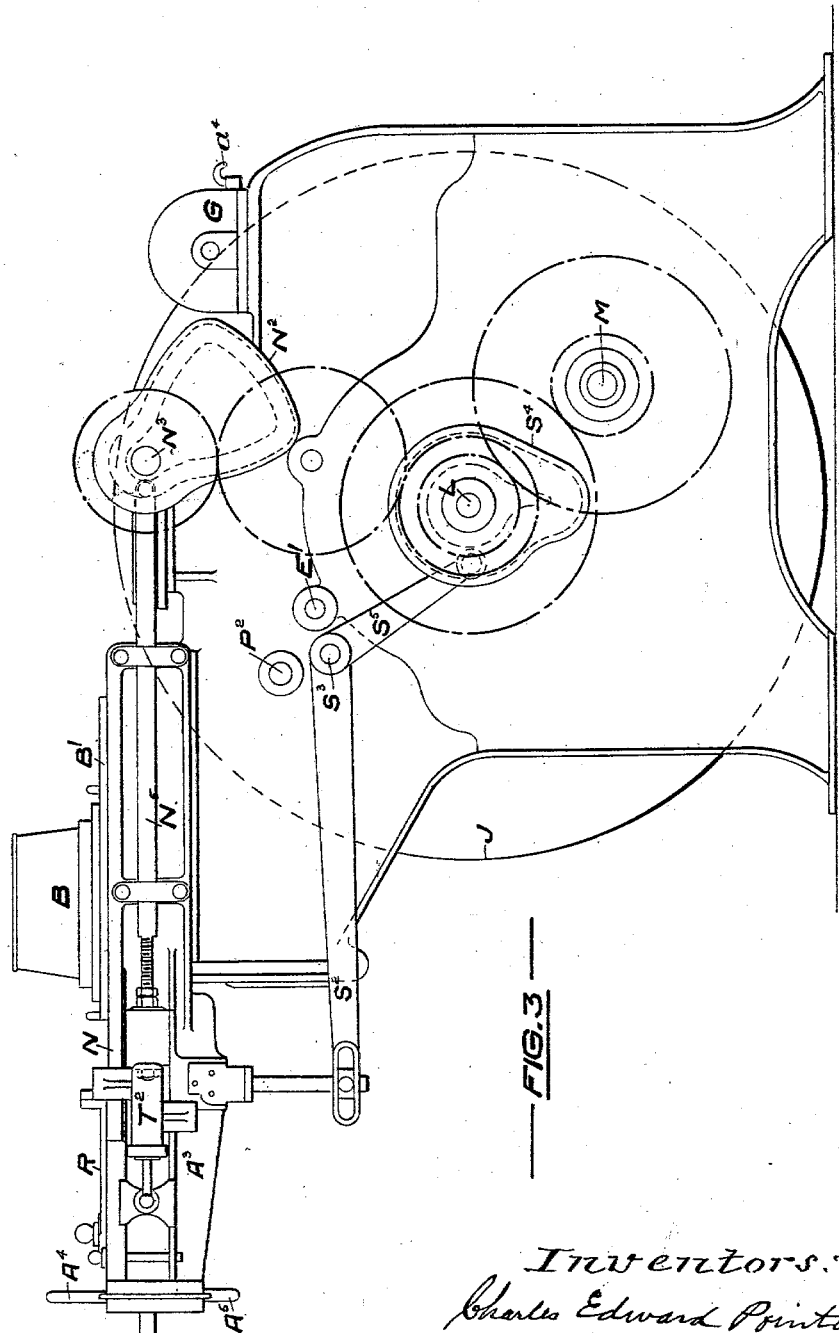
Figure 4:
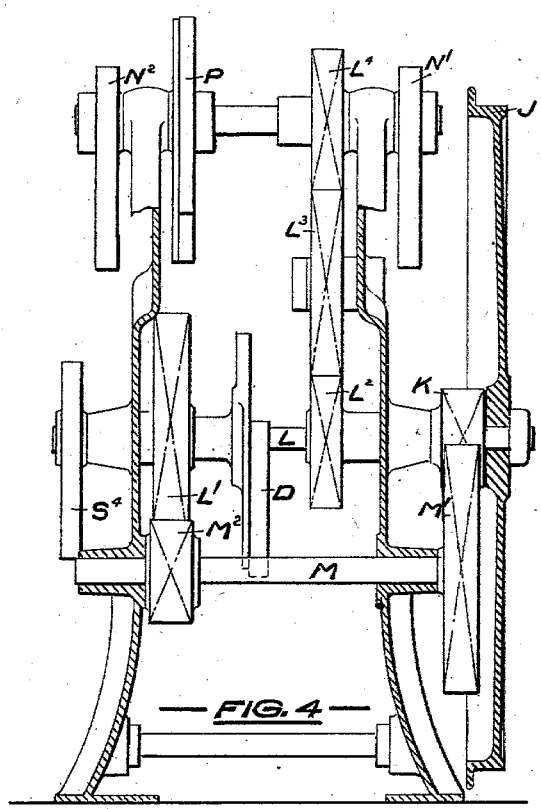

In the five accompanying sheets of explanatory drawings, to be hereinafter referred to, Figure 1 is a side elevation with one of the side frames removed and with part in section; Fig. 2, a plan illustrating a dough-dividing machine constructed in accordance with our invention. Fig. 3 is a side elevation of the complete machine. Fig. 4 is a sectional end view of the machine. Fig. 5 is a sectional plan, to a larger scale, of the means of adjusting the machine to the required weight of the portions into which the dough is to be divided, while Fig. 6 is a similar view showing the parts in a different position of adjustment. Fig. 7 is an elevation showing the means for raising and supporting the main ram for cleaning purposes. Fig. 8 is an end view showing the arched cross-stays at the front end of the machine.

The same reference-letters in the different views indicate the same parts.

In the construction of a dough-dividing machine in accordance with our invention we arrange the reciprocating ram A beneath the hopper B, into which the unweighed mass of dough is fed. The reciprocation of the ram A is effected by the combined action of the weight C and the cam D on the lever E, pivoted at E', the upper end of such lever being connected with the ram by the links F F'. The instroke of the ram A on its movement in the direction of the arrow 1 at Fig. 1 is produced by the descent of the weight C, which is arranged at the back end of the machine and is connected by the chains, as C', passing over the guide-pulleys $C^2$ and $C^3$, with the lower end of the lever E. The guide-pulleys $C^2$ and $C^3$ are keyed or otherwise secured to their supporting shafts or spindles, which revolve in bearings formed in the ends of a strong stretcher or cross-stay G, fixed to and rigidly connecting and staying the side frames of the machine. Such stretcher or cross-stay also forms a guard for the upper pair of pulleys $C^2$ and $C^3$. The outstroke of the ram, or its movement in the direction opposite to that indicated by the arrow 1 at Fig. 1, is produced by the action of the revolving cam D on the roller D', which revolves on a pin or axle fixed to the lever E. The length of the instroke of the ram under the action of the falling weight C (by which action the density or pressure at which the dough is divided or actually weighed and kept constant) will vary with the volume of the portion of dough which is separated from the mass in the hopper B during such instroke by the knife H, fixed to the division-box N, and with the resistance or consistency of such dough; but under the action of the cam D the ram will be always brought back to its outermost position, or the position in which it is shown at Fig. 1, and during such return movement the weight C will be raised in readiness for effecting by its subsequent descent the next instroke of the ram A.

The whole of the moving parts of the machine are driven by gearing from the flywheel J, which is revolved by belting from a counter-shaft arranged in any convenient position. Instead of arms or spokes a web of a solid disk form is substituted in order that it shall serve as a guard for the gearing arranged between the wheel and the adjacent side frame of the machine. The driving flywheel J and the small toothed wheel or pinion K, connected to it, are mounted loosely upon the projecting end of the shaft L, on the central part of which is keyed or secured the cam D, hereinbefore described. The pinion K engages or gears with the toothed wheel $M'$ on the shaft M, while the pinion or small toothed wheel $M^2$ on the same shaft engages or gears with the toothed wheel $L'$ on the shaft L, and the said shaft L is thus set in motion.

The reciprocation of the division-box N (which is divided into chambers for the reception of the dough carried forward by the instroke of the ram A) is effected by the action of the cams $N' N^2$ on the shaft $N^3$, the said cams being in connection with one end of the side bars or rods $N^4 N^5$, while the opposite ends of such bars are secured adjustably to side projections from the box N. The rising-and-falling motion of the cutting-off knife O (by which the dough in the division-chambers of the box N is separated from the dough in the main top box $A'$) is effected or produced by the action of the single cam P on one end of the lever $P'$, the said cam P being fixed between the side frames of the machine on the shaft $N^3$. The lever $P'$ is fixed to the pivot-shaft $P^2$, and to such shaft we also fix the arms or levers $P^3 P^4$, having their outer ends connected with the cutting-off knife O. The shaft $N^3$ is revolved by the toothed wheel $L^2$ on the shaft L gearing with the idle or intermediate wheel $L^3$, the said wheel $L^3$ being also in gear or engagement with the toothed wheel $L^4$ on the shaft $N^3$.

We arrange for the adjustment necessary to permit of the division of the dough into portions of such weight as may be required by connecting the rods $Q'$ of the plungers, as Q, with which each division-chamber of the box N is provided, to a cross-head $Q^2$, having an extension-rod $Q^3$ secured to it, as shown more clearly in the enlarged detail view at Figs. 5 and 6. Such extension-rod $Q^3$ passes through the bush or sleeve $Q^4$, which screws into the central boss of the two-arm brackets R $R'$, bolted to and projecting from the division-box N. The head of the externally-screwed bush or sleeve $Q^4$ is provided with projections or handles $Q^5$, by which its position within the internally-screwed central boss attached to the brackets R $R'$ can be readily adjusted. The bush or sleeve is retained at its adjusted position by the lock-nut $Q^6$, which is also provided with handles. At the outer extremity of the extension-rod $Q^3$ we fix a flange or collar $Q^7$. On the reciprocation of the two-arm brackets R $R'$ with the division-box N, to which they are attached, by the action of the cams $N' N^2$ and the side rods $N^4 N^5$, as hereinbefore described, the cross-head $Q^2$ and its attached rods $Q'$ and plungers Q have the necessary reciprocating movement imparted to them for the purpose of carrying the divided portions of dough into position for discharge by the contact of the central boss of the two-arm brackets R $R'$ with the outer collar $Q^7$ in the one direction and by the contact of the adjustable bush or sleeve $Q^4$ with the body of the cross-head $Q^2$, the travel of which is limited by stops $Q^8$, fitted in the guides $A^2$ and $A^3$, in the other direction. As the outer collar $Q^7$ is fixed to the rod $Q^3$, the inner faces of the plungers Q, attached to the cross-head $Q^2$, are always brought back (whatever depth the division-chambers are adjusted to) far enough to permit of the elevation of the scraper S, by which the divided portions of dough are separated and their falling clear from the plungers assured; but as the bush or sleeve $Q^4$ is adjustable the length of the stroke of the plungers Q can be varied, thereby varying the depths of the division-spaces in the box N available for the reception of the dough brought forward by the action of the ram A. By this method of adjustment of the plungers to suit the required weight of the dough portions no corresponding variation of the position of the scraper S is necessary. As it is shown at Fig. 5, the adjustable bush or sleeve $Q^4$ is screwed to its full extent within the central boss of the brackets R $R'$, and in such a position the division-chambers are gaged or set to the maximum depths; but by unscrewing the bush or sleeve from the central boss of the brackets R $R'$ the plungers Q are forced a corresponding distance within their chambers in the division-box N and the contact with the cross-head $Q^2$ will be made earlier in the return stroke or movement of the division-box N, to which the brackets R $R'$ are attached, and thus the stroke of the plungers within the division-chambers will be shortened, and thus limit the space available for the reception of the dough. As shown at Fig. 6, the bush or sleeve $Q^4$ is screwed to its full extent in the opposite direction to that shown at Fig. 5.

The rising-and-falling motion of the scraper S is imparted by the levers $S'$ and $S^2$, mounted on the rocking or pivot shaft $S^3$, the rocking motion of the said shaft $S^3$ being obtained by the action of the cam $S^4$ (secured to the shaft L) on the lever $S^5$, which is mounted on the shaft $S^3$.

We arrange spring stops or buffers, as $T'$ and $T^2$, on the sides of the machine for the purpose of preventing belated movement of the plungers Q and their cross-head $Q^2$ on the instroke or return stroke of the division-box N, (such movement being in the direction indicated by the arrow 2 at Fig. 1.) By the use of such spring-buffers (which are compressed when the plungers are moved inward on the contact of the adjustable bush $Q^4$ with the cross-head $Q^2$) the plungers are carried to their proper end position within the division-spaces of the box N, as is determined by the adjustment hereinbefore described, and thus we can insure uniformity in the weight of the divided portions of the dough.

To permit of the ready withdrawal and subsequent supporting of the plungers Q and their rods Q' and cross-head $Q^2$, we employ a pair of supporting bars or rails, which, as U U', may be detachable, having suitably-shaped ends for hooking onto the end of the machine, as shown, in such positions that on detaching the pins or bolts $R^2$ $R^3$ on the brackets R R' and the stops $Q^8$ in the guides $A^2$ $A^3$ the plungers, rods, and cross-head can be drawn out onto the said bars or rails U U' and be supported thereby during cleaning and inspection. The bars or rails can be readily unhooked and removed from the machine, or they may be made so as to telescope, hinge, or otherwise be placed out of position.

We provide for the raising and lowering of the main ram A and for the supporting of the same for cleaning and inspection purposes by connecting a lever $a$ to the ram-pin $a'$, as shown in the detail view at Fig. 7, such lever $a$ having its fulcrum upon the upper end of the ram-operating lever E. The arm or other end $a^2$ of the lever $a$ may be detachable in order that it may be removed, if desired, when the machine is in service. By depressing the outer end $a^2$ of the lever $a$ the ram A can be readily raised, as shown in dotted lines, and by securing the chain $a^3$, depending from the extremity of $a^2$, to the hook $a^4$ on the guard G the ram can be maintained at its elevated position during the operation of cleaning.

For the convenient and accurate machining and fitting of the cross-head and division-box guides $A^2$ $A^3$ (which are cast in one piece with the main top box A') and to insure that they shall be sufficiently rigid to permanently retain the accuracy of alinement or fitting we dispose a pair of arched cross-stays, as $A^4$ $A^5$, between the guides, as shown at Figs. 1 and 2 and also at the end view at Fig. 8, such stays preferably forming a part of the casting itself. The stays are so curved and disposed in relation to the guides $A^2$ $A^3$ as to permit of ready access for the planing or machining of the inner parts and guiding-surfaces of the casting and to allow the plungers Q and also the division-box N and brackets R R' to be passed in or out clear of the stays.

Having now described our invention, what we claim as new, and desire to secure by Letters Patent, is—

1. In machines for dividing dough and like plastic material into portions of uniform weight, the combination with the division-box N having the brackets R R' secured thereto and the cross-head $Q^2$ to which the plunger-rods Q' are attached, of the adjustable bush or sleeve $Q^4$ and the extension-rod $Q^3$ having a collar $Q^7$ fixed to its outer end, substantially as set forth.

2. In machines for dividing dough and like plastic material into portions of uniform weight, the combination with the reciprocating cross-head $Q^2$ to which the plunger-rods Q' are attached, of the spring-buffers T T', substantially as set forth.

3. In machines for dividing dough and like plastic material into portions of uniform weight, the combination with the guides $A^2$ $A^3$ for the sliding cross-head Q and division-box N, of the detachable bars or rails U U', substantially as set forth.

4. In machines for dividing dough and like plastic material into portions of uniform weight, the combination with the ram A of the lever $a$ having its fulcrum upon the upper end of the ram-operating lever E and provided with a detachable end $a^2$, substantially as set forth.

5. In machines for dividing dough and like plastic material into portions of uniform weight, the construction in one piece with the main top box A' and the cross-head and division-box guides $A^2$ $A^3$, of the arched cross-stays $A^4$ $A^5$ at the outer or front end of the said guides $A^2$ $A^3$, substantially as set forth.

6. In machines for dividing dough and like plastic material into portions of uniform weight, the combination with the ram-operating cam D, the division-box-operating cams $N'$ $N^2$, the cutting-off-knife-operating cam P, and the scraper-operating cam $S^4$, of the combined driving-wheel and gearing-guard J connected with the whole of the said cams by a single set of gearing, substantially as set forth.

In witness whereof we have hereunto set our hands in presence of two witnesses.

CHARLES EDWARD POINTON.
JOHN EDWARD POINTON.

Witnesses:
EDWARD MARKS,
HERBERT BOWKETT.